(12) United States Patent
Kutsumi et al.

(10) Patent No.: US 8,958,080 B2
(45) Date of Patent: Feb. 17, 2015

(54) DOCUMENT IMAGE GENERATING APPARATUS, DOCUMENT IMAGE GENERATING METHOD AND COMPUTER PROGRAM, WITH ADJUSTMENT OF RUBY-ADDED IMAGE

(75) Inventors: Takeshi Kutsumi, Osaka (JP); Ichiko Sata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 785 days.

(21) Appl. No.: 12/981,675

(22) Filed: Dec. 30, 2010

(65) Prior Publication Data
US 2011/0164291 A1 Jul. 7, 2011

(30) Foreign Application Priority Data
Jan. 7, 2010 (JP) .................................. 2010-002097

(51) Int. Cl.
G06K 15/02 (2006.01)
G06K 9/46 (2006.01)
G06F 17/28 (2006.01)
G06F 17/21 (2006.01)
G06F 17/24 (2006.01)

(52) U.S. Cl.
CPC ............ *G06F 17/289* (2013.01); *G06F 17/214* (2013.01); *G06F 17/241* (2013.01)
USPC .......................................... 358/1.11; 382/190

(58) Field of Classification Search
None
See application file for complete search history.

(56) References Cited

U.S. PATENT DOCUMENTS

| | | | | | |
|---|---|---|---|---|---|
| 4,323,892 | A | * | 4/1982 | Kinghorn | ...................... 345/467 |
| 4,727,588 | A | * | 2/1988 | Fox et al. | ...................... 382/189 |
| 2009/0055159 | A1 | * | 2/2009 | Kato | .................................. 704/3 |

FOREIGN PATENT DOCUMENTS

| | | |
|---|---|---|
| JP | 5-54069 A | 3/1993 |
| JP | 2009-53838 A | 3/2009 |
| JP | 2009-294788 A | 12/2009 |

* cited by examiner

*Primary Examiner* — Barbara Reinier
*Assistant Examiner* — Christopher D Wait
(74) *Attorney, Agent, or Firm* — Birch, Stewart, Kolasch & Birch, LLP

(57) ABSTRACT

Regarding a wording including a character stored neither in character DB1 storing characters whose shapes have portions to be positioned under a base line nor in other character DB2 storing characters that are positioned to separate upward from the base line, a mean YBav calculated with bottom Y coordinates of all characters neither stored in the DB1 nor DB2 is designated as a bottom Y coordinate of wording. Regarding a wording including only characters stored in the DB1, a predetermined value is added to a mean YBav0 calculated with bottom Y coordinates of all characters for obtaining an YBav designated as a bottom Y coordinate of wording. Regarding a wording configured with only characters stored in the DB2, a predetermined value is subtracted from a mean YTav calculated with top Y coordinates of all character marks for obtaining a YBav designated as a bottom Y coordinate of wording.

20 Claims, 14 Drawing Sheets

X-ray crystallographic analysis also confirmed the molecular structure.

X-ray crystallographic
X線結晶解析
analysis also confirmed
　　　　　　　　確認する
the molecular structure.
　分子の　　　構造

F I G. 4

| CHARACTER NUMBER | LEFT-END X COORDINATE | TOP-END Y COORDINATE | RIGHT-END X COORDINATE | BOTTOM-END Y COORDINATE | REGION NUMBER | IN-LINE POSITION INFORMATION | SIZE | RECOGNITION RESULT |
|---|---|---|---|---|---|---|---|---|
| 2617 | 37 | 290 | 43 | 284 | 5 | 1 | 7 | X |
| 2618 | 43 | 286 | 46 | 285 | 5 | 0 | 7 | - |
| 2619 | 46 | 288 | 49 | 283 | 5 | 0 | 7 | r |
| 2620 | 49 | 288 | 53 | 283 | 5 | 0 | 7 | a |
| 2621 | 54 | 288 | 57 | 282 | 5 | 0 | 7 | y |
| 2622 | 54 | 288 | 57 | 282 | 5 | 0 | 7 |  |
| 2623 | 62 | 288 | 65 | 283 | 5 | 0 | 7 | c |
| 2624 | 66 | 288 | 69 | 283 | 5 | 0 | 7 | r |
| 2625 | 69 | 287 | 73 | 282 | 5 | 0 | 7 | y |
| 2626 | 73 | 288 | 76 | 283 | 5 | 0 | 7 | s |
| 2627 | 77 | 288 | 79 | 283 | 5 | 0 | 7 | t |
| 2628 | 79 | 288 | 83 | 283 | 5 | 0 | 7 | a |
| 2629 | 83 | 289 | 85 | 283 | 5 | 0 | 7 | l |
| 2630 | 86 | 289 | 88 | 283 | 5 | 0 | 7 | l |
| 2631 | 89 | 287 | 92 | 283 | 5 | 0 | 7 | o |
| 2632 | 93 | 287 | 97 | 281 | 5 | 0 | 7 | g |
| 2633 | 98 | 287 | 100 | 283 | 5 | 0 | 7 | r |
| 2634 | 101 | 287 | 104 | 283 | 5 | 0 | 7 | a |
| 2635 | 105 | 287 | 109 | 281 | 5 | 0 | 7 | p |
| 2636 | 109 | 289 | 113 | 283 | 5 | 0 | 7 | h |
| 2637 | 113 | 289 | 115 | 283 | 5 | 0 | 7 | i |
| 2638 | 116 | 287 | 119 | 283 | 5 | 2 | 7 | c |
| 2639 | 37 | 278 | 41 | 284 | 5 | 1 | 7 | a |
| 2640 | 41 | 278 | 45 | 284 | 5 | 0 | 7 | n |
| 2641 | 46 | 278 | 49 | 284 | 5 | 0 | 7 | a |
| 2642 | 49 | 230 | 51 | 284 | 5 | 0 | 7 | l |
| 2643 | 52 | 278 | 56 | 284 | 5 | 0 | 7 | y |
| 2644 | 56 | 278 | 59 | 283 | 5 | 0 | 7 | s |
| 2645 | 60 | 279 | 61 | 283 | 5 | 0 | 7 | i |
| 2646 | 62 | 278 | 65 | 283 | 5 | 0 | 7 | s |

F I G. 5
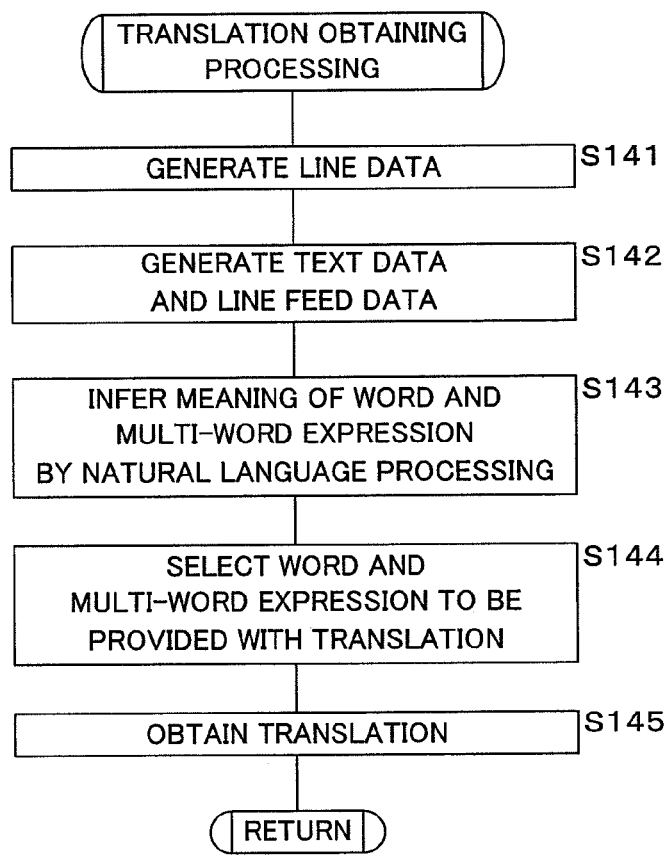

FIG. 6

| LINE NUMBER | | LINE TEXT |
|---|---|---|
| 0 | : | X-ray crystallographic |
| 1 | : | analysis also confirmed |
| 2 | : | the molecular structure. |

FIG. 7A

X-ray crystallographic analysis also confirmed the molecular structure.

FIG. 7B

| LINE NUMBER | LINE FEED POSITION |
|---|---|
| 0 : | 22 |
| 1 : | 46 |
| 2 : | 71 |

FIG. 8

| WORD OR MULTI-WORD EXPRESSION | TRANSLATION |
|---|---|
| X-ray crystallographic analysis | X線結晶分析 |
| confirmed | 確認する |
| molecular | 分子の |
| structure | 構造 |

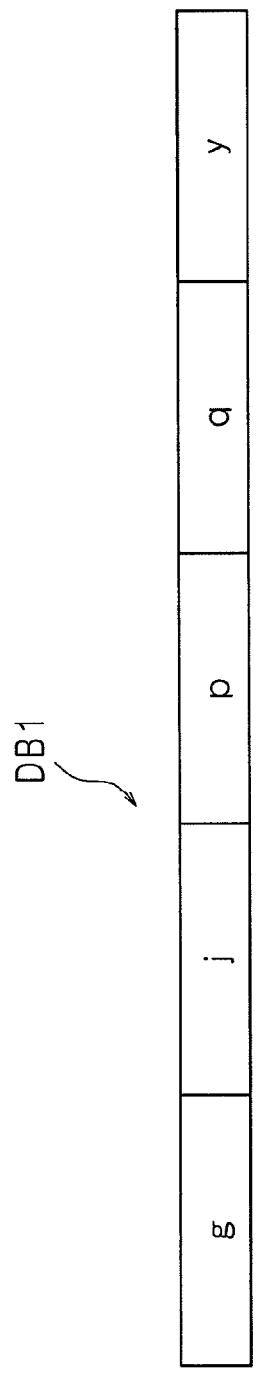
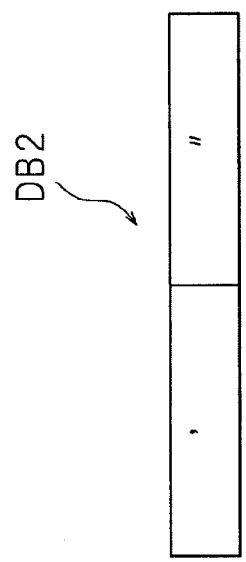
FIG. 12A
FIG. 12B

F I G. 14
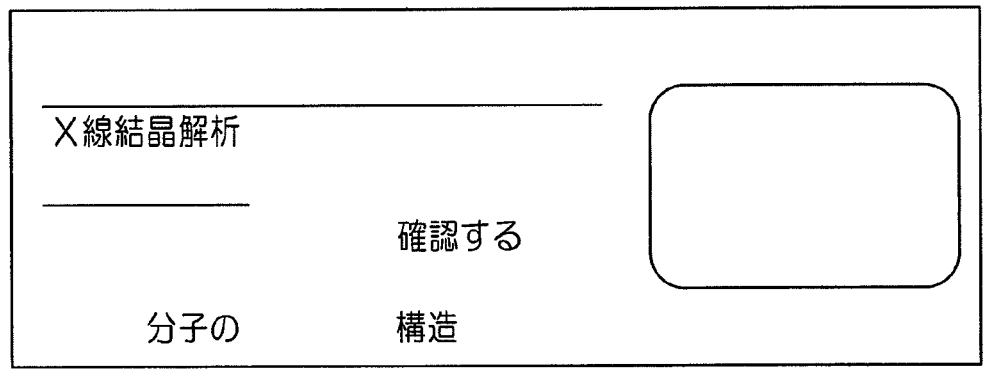

DOCUMENT IMAGE GENERATING APPARATUS, DOCUMENT IMAGE GENERATING METHOD AND COMPUTER PROGRAM, WITH ADJUSTMENT OF RUBY-ADDED IMAGE

CROSS-REFERENCE TO RELATED APPLICATION

This Nonprovisional application claims priority under 35 U.S.C. §119(a) on Patent Application No. 2010-002097 filed in Japan on Jan. 7, 2010, the entire contents of which are hereby incorporated by reference.

BACKGROUND OF THE INVENTION

1. Field of the Invention

The present invention relates to a document image generating apparatus, a document image generating method and a computer program for generating an image of supplemental annotation added document in which a supplemental annotation is added to a wording configured with a word or phrase included in an image based on image data.

2. Description of Related Art

Recently, it is known to recognize characters from an original text included in an image (original document image) based on electronic data, for example, obtained through reading a document image with a scanner or generated in order to show on a web browser, and to add a supplemental annotation for the recognized characters into an interline space of original text (referred to as "ruby", which are small characters and short runs of text alongside the base original text, typically used in East Asian documents to indicate pronunciation or to provide a short annotation). For example, Japanese Patent Application Laid-Open No. 2009-53838 proposes a method for aligning a translated sentence in the interline space of each line included in an original text. In paragraphs 0044-0046 of Japanese Patent Application Laid-Open No. 2009-53838, the interline space and a height of interline space (a length of interline space in the Y-axis direction intersecting the line-writing direction) are defined for each line.

SUMMARY OF THE INVENTION

However, some characters are known to be aligned across the so-called base line utilized for aligning characters sequentially, for example, lowercase alphabetical characters "g", "j", "p", "q" and "y". When any of such characters is present in the case that a ruby is added in the interline space under a line, Y coordinates corresponding to bottom ends of original text may be varied in each word or phrase, in accordance with the shapes of characters included in the original text. Similar variation may be caused by the presence of character mark that is as a whole far from the base line, such as the single-quotation-mark (') and the double-quotation-mark ("). Thus, in the case that Y coordinates corresponding to upper ends of interline space where the ruby is added are uniformly defined within each line, the added ruby may not look properly aligned in the interline space under the word or phrase.

The present invention is made in view of such circumstances and has an object to provide a document image generating apparatus, a document image generating method and a computer program that are for adding a supplemental annotation (ruby) which looks properly aligned in an interline space under or above a wording configured with a word or a phrase.

The above and further objects and features of the invention will more fully be apparent from the following detailed description with accompanying drawings.

BRIEF DESCRIPTION OF THE DRAWINGS

FIG. 4 is a conceptional view showing an example of character data obtained by character recognition processing.

FIG. 5 is a flowchart showing a procedure for translation obtaining processing of step S14.

FIG. 6 is a conceptional view showing example contents of line data.

FIG. 7A and FIG. 7B are conceptional views showing example contents of text data and line feed data.

FIG. 8 is a conceptional view showing example contents of translation data.

FIG. 12A and FIG. 12B are explanation views showing characters represented by character codes stored in special character database.

FIG. 14 is a schematic view showing an example of translation image.

DESCRIPTION OF THE PREFERRED EMBODIMENTS

Hereinafter, an embodiment of the present invention is described in detail with reference to figures.

Figure 1:
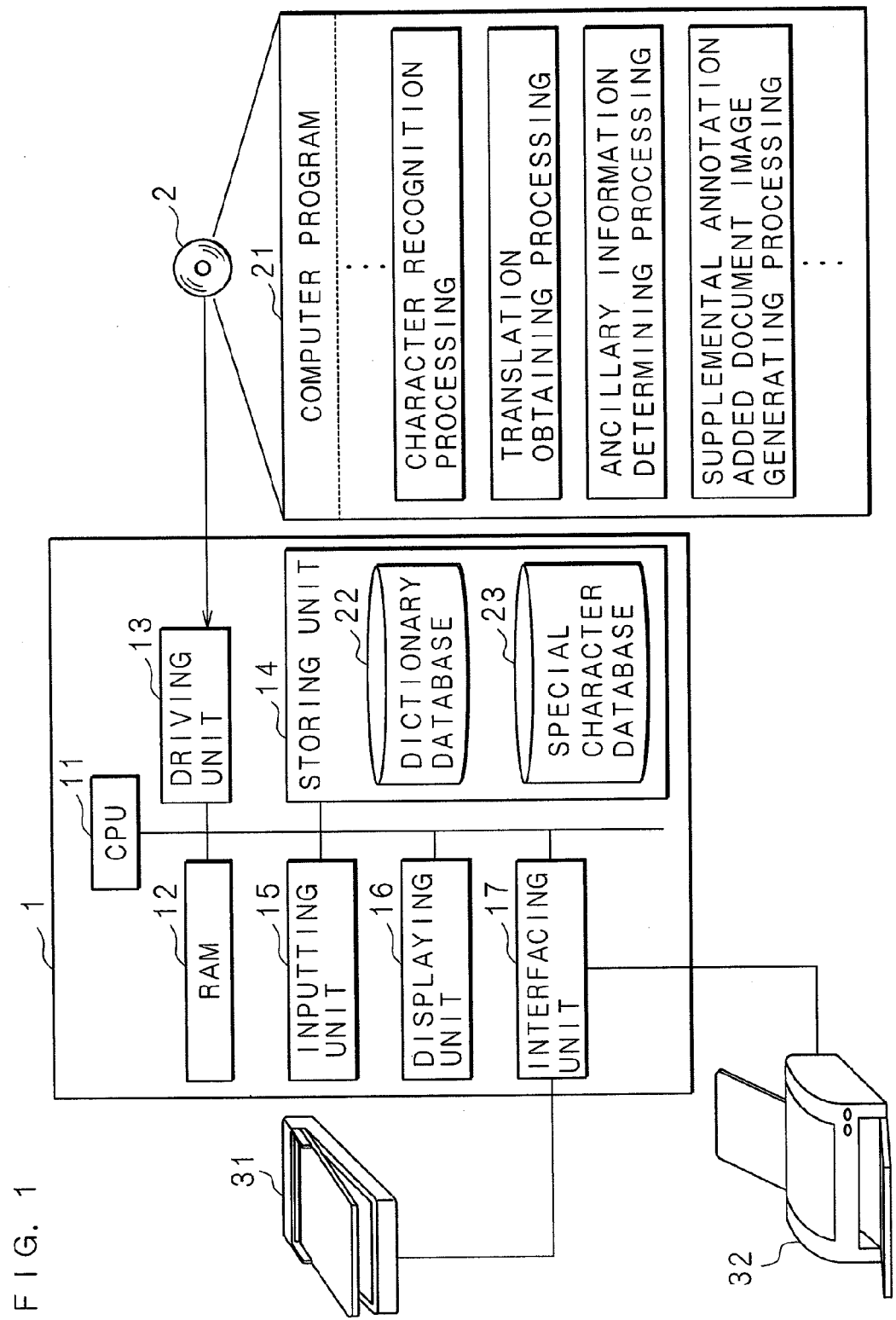
FIG. 1 is a block diagram showing inner components of document image generating apparatus according to the present invention.

FIG. 1 is a block diagram showing inner components of document image generating apparatus according to the present invention. An item number "1" in FIG. 1 is the document image generating apparatus that is configured with a general-purpose computer, such as a personal computer (PC) and a server apparatus. The document image generating apparatus 1 includes: a CPU 11 that performs calculations; a RAM 12 that stores temporal information generated in response to the calculations; a driving unit, such as CD-ROM drive that reads out information from a recording medium 2, such as optical disk and memory card; and a storing unit 14, such as hard-disk.

The CPU 11 utilizes the driving unit 13 to read out a computer program 21 according to the present invention from the recording medium 2, and stores the read computer program 21 in the storing unit 14. As needed, the computer program 21 is loaded from the storing unit 14 into the RAM 12. In accordance with the loaded computer program 21, the CPU 11 carries out processing required for the document image generating apparatus 1.

Alternatively, the computer program 21 may be downloaded to the document image generating apparatus 1 from an external server apparatus (not shown) through a communication network, such as Internet and LAN, and may be stored in the storing unit 14.

The storing unit 14 further stores dictionary database 22 and special character database 23. The dictionary database 22 includes data required for natural language processing, and the special character database 23 includes data of characters having special shapes. Particularly, the dictionary database 22 includes information regarding grammar of language, occurrence frequency of grammatical construction, meaning of word and the like, and the special character database 23 includes character codes representing characters that are designed to have the part or the whole located away from the baseline of alphabetical font. The dictionary database 22 and the special character database 23 may be stored by the storing unit 14 in advance, or alternatively read out from the recording medium 2 by the driving unit 13 and then stored by the storing unit 14.

The document image generating apparatus 1 further includes: an inputting unit 15, such as a keyboard or a pointing device, which inputs several information, e.g., operation instructions in response to user's handling; displaying unit 16, such as a liquid crystal display, which displays several information; and an interfacing unit 17 that is connected to an image reading apparatus 31 and an image forming apparatus 32. The image reading apparatus 31 may be a scanner, such as a flatbed scanner or a film scanner. The image forming apparatus 32 is a printer, such as an inkjet printer or a laser printer.

Anyway, it may be alternatively configured to combine the image reading apparatus 31 and the image forming apparatus 32, as one unit.

The image reading apparatus 31 optically reads a document image of original document, generates image data, and then sends the generated image data to the document image generating apparatus 1. The interfacing unit 17 receives the image data sent from the image reading apparatus 31. In addition, the interfacing unit 17 receives image data sent from the CPU 11 and then sends the image data to the image forming apparatus 32. The image forming apparatus 32 forms an image based on the image data sent from the document image generating apparatus 1.

The CPU 11 loads the computer program 21 according to the present invention into the RAM 12, and carries out the document image generating method according to the present invention in accordance with the loaded computer program 21. According to this document image generating method, the image reading apparatus 31 reads out a document image of original document and thus generates image data, the generated image data is received, a translation is generated for a word or a multi-word expression included in an original document image based on the received image data, and then a translation added document image is generated in which the translation is added to the original document image.

In this embodiment, the "multi-word expression (herein after abbreviated to MWE)" means a wording, such as a noun phrase, a phrasal verb, an idiom and a peculiar expression, which is configured with plural words and makes its own meaning.

Figure 2A:
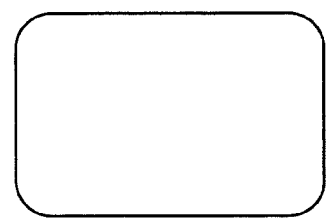
FIG. 2A and FIG. 2B are schematic views showing examples of original document image and translation added document image.
Figure 2B:
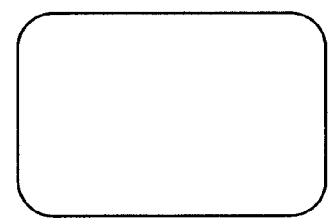

FIG. 2A and FIG. 2B are schematic views showing examples of original document image and translation added document image. FIG. 2A illustrates the example of original document image, and FIG. 2B illustrates the example of translation added document image. The original document image illustrated in FIG. 2A includes a sentence "X-ray crystallographic analysis also confirmed the molecular structure.". As illustrated in FIG. 2B, the document image generating method according to the present invention generates the translation added document image that is provided with translations for the phrase "X-ray crystallographic analysis", the word "confirmed", the word "molecular" and the word "structure". This embodiment is explained in the example context of translation being for a horizontal writing word or phrase and being aligned in an interline space under the horizontal writing word or phrase, as illustrated in FIG. 2A and FIG. 2B.

Figure 3:
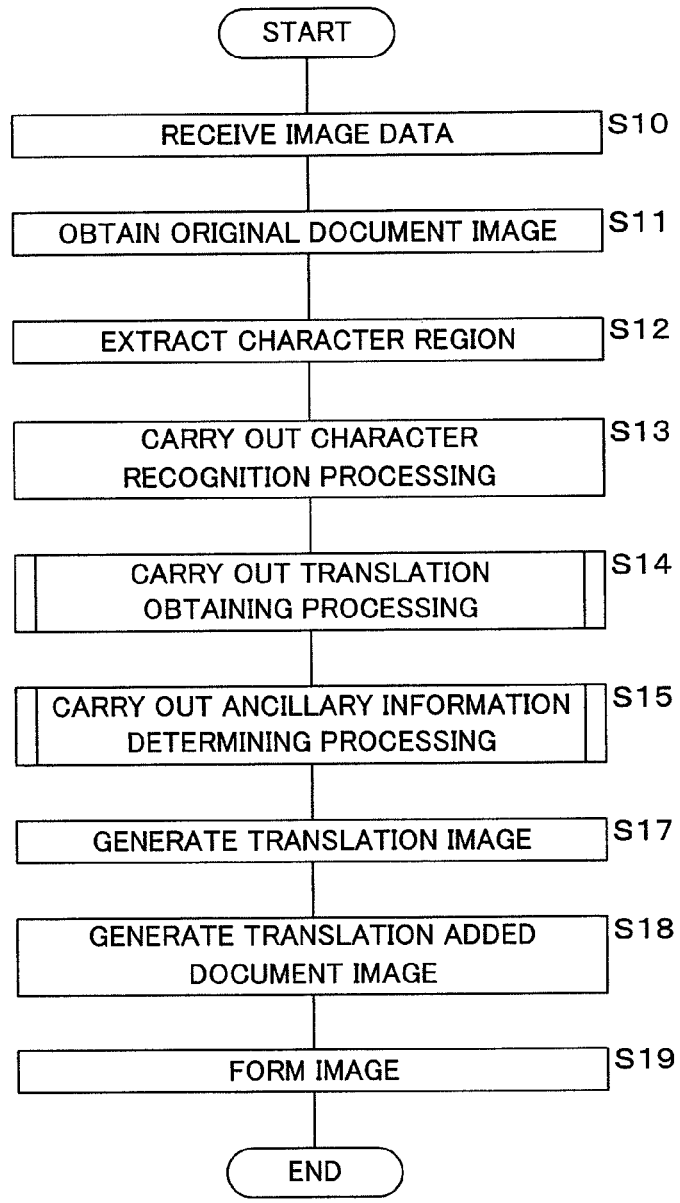
FIG. 3 is a flowchart showing a procedure performed by the document image generating apparatus.

FIG. 3 is a flowchart showing a procedure performed by the document image generating apparatus 1. The CPU 11 carries out the following processing in accordance with the computer program 21 loaded in the RAM 12. At first, the document image generating apparatus 1 receives image data of read document image (S10), and carries out processing for obtaining an original document image based on the received image data (S11). At the steps S10 and S11, a user handles the inputting unit 15 in a condition of original document placed on the image reading apparatus 31, the inputting unit 15 accepts the operation instruction in response to the user's handling, and then the CPU 11 sends the accepted operation instruction through the interfacing unit 17 to the image reading apparatus 31 for instructing the image reading apparatus 31 to read the image of placed original document.

The image reading apparatus 31 optically reads out a document image of original document, generates image data based on the read document image, and then sends the generated image data to the document image generating apparatus 1. The document image generating apparatus 1 utilizes the interfacing unit 17 to receive/accept the image data sent from the image reading apparatus 31 and stores the received/accepted image data in the RAM 12, in order to carry out the processing for obtaining the original document image based on the received/accepted image data. Alternatively, it may be configured to previously store image data in the storing unit 14 and to read out the stored image data onto the RAM 12, instead of the steps S10 and S11, in order to carry out the processing for obtaining the original document image. As needed, the CPU 11 may additionally carry out image processing at the step S11, such as adjusting resolution and converting data format.

The CPU 11 then extracts a character region from the original document image stored in the RAM 12 (S12). The "character region" means a region including characters. The CPU 11 then carries out processing for recognizing characters included in the extracted character region (S13). For example, the CPU 11 utilizes a conventional optical character recognition (OCR) technique at the step S13, to recognize the characters included in the character region and to identify the positions of characters in the original document image.

FIG. 4 is a conceptional view showing an example of character data obtained by character recognition processing. The example illustrated in FIG. 4 is a result of processing that characters are recognized from the example of original document image illustrated in FIG. 2A. The character data obtained through character recognition processing include the result of character recognition and the ancillary information regarding the characters. The character recognition processing is configured to recognize even a character space in a line as the "character". Thus, the character data may include the result of character space recognition and the ancillary information regarding the character space. The character data illustrated in FIG. 4 include as the recognition result: character numbers sequentially assigned to respective characters; positions of respective characters in the original document image; region numbers assigned to respective character regions; in-line position information representing a position of character in a line; sizes of respective characters; and recognition result of respective characters. Each position of character is represented with an X coordinate for the left end of character, a Y coordinate for the top end of character, an X coordinate for the right end of character and a Y coordinate for the bottom end of character.

The example illustrated in FIG. 4 defines the left-bottom end of original document image as the original point for the coordinates. The in-line position information represents the position of each character in a line with any number among a number "1" indicating the head of line, a number "2" indicating the end of line, a number "0" indicating the midway between the head and the end of line, and a number "3" indicating both the head and the end of line. For example, when an original document image includes a character at some position but not the other character at the left side of position, the CPU 11 generates "1" as the in-line position information. For example, when an original document image includes a character at some position but not the other character at the right side of position, the CPU 11 generates "2" as the in-line position information. For example, when an original document image includes a character at some position but the other character neither at the left nor right sides of position, the CPU 11 generates "3" as the in-line position information. The size of character is represented with a font size. The CPU 11 obtains character data through the character recognition processing at the step S13 and stores the obtained character data in the RAM 12.

The CPU 11 then carries out the translation obtaining processing in accordance with the character data obtained through the character recognition processing, for obtaining a translation for a word or phrase included in the sentence configured with the recognized characters (S14).

FIG. 5 is a flowchart showing a procedure for the translation obtaining processing of step S14. The CPU 11 generates line data representing contents of wording included in each line of original document image, in accordance with the character data based on the characters recognized at the step S13 (S141). At the step S141, the CPU 11 arranges the characters from the head of line to the end of line sequentially in accordance with the character numbers, in order to generate the line data for one line. Furthermore, the CPU 11 similarly generates the other line data for the other lines.

FIG. 6 is a conceptional view showing example contents of line data. The examples illustrated in FIG. 6 are line data generated from the original document image illustrated in FIG. 2A. In FIG. 6, a number "0" is utilized as the start value for sequentially assigning line numbers to respective lines, and the assigned line numbers are associated with line texts representing contents of wording in respective lines. The line text is configured with a character code representing the character recognized through the character recognition processing.

The CPU 11 then generates text data representing contents of wording included in the original document and generates line feed data representing a position of line feed in the original document image, in accordance with the generated line data (S142). At the step S142, the CPU 11 connects line texts of respective lines with each other, in reference with their line numbers, to generate text data. In the case that the original document image includes a language, such as English, whose words are respectively separated with space characters, space characters are inserted into the ends of respective line texts and then the line texts are connected with each other. The reason is that words are often separated at the line feed position in such a language whose words are respectively separated with space characters. In the case that the original document image includes a language, such as Japanese, whose words are not separated with space characters, the CPU 11 connects the line texts with each other, without inserting space characters. At the step S142, every time when connecting a line text with another line text, the CPU 11 further generates line feed data representing a position in the generated text data which corresponds to the position of line feed in the original document image.

FIG. 7A and FIG. 7B are conceptional views showing example contents of text data and line feed data. FIG. 7A illustrates an example of text data that is configured with respective line data in FIG. 6 sequentially connected with each other. The text data in FIG. 7A is just for one line, although illustrated in two-line form. As the text data is generated at the step S142, the generated text data includes characters recognized at the step S13 within the character region extracted at the step S12. Therefore, the text data generated at the step S142 basically includes plural words.

FIG. 7B illustrates example contents of line feed data representing each line feed position with a character number sequentially assigned from a number "0" for all characters included in a line indicated with each line number. In the case of language whose words are respectively separated with character spaces, the line feed position may be the position where the character space is inserted for connecting line texts as illustrated in FIG. 7B. In the case of language whose words are not separated with character spaces, the line feed position may be the position of character at the end of each line. Since the text data is generated with the line data connected at the line feed position to another line data, it is possible to perform the natural language processing (described later) even on the sentence expressed in plural line form. Therefore, it is possible to carry out the natural language processing with higher efficiency and higher accuracy. For example, when the natural language processing is carried out on the MWE expressed in plural lines, it is possible to obtain translations just for respective words included in the MWE. However, when the natural language processing is carried out on the sentence expressed in plural lines, it is possible to obtain translations even for respective MWEs included in the sentence.

The CPU 11 then carries out the natural language processing on the generated text data, to infer the meaning of word and MWE included in the wording represented by the text data (S143). At the step S143, the CPU 11 carries out the natural language processing, such as morphological analysis of wording, local analysis of grammatical construction, and part-of-speech tagging, in accordance with the data stored in the dictionary database 22. Thus, it is possible to identify a word included in a wording, to identify a MWE configured with plural words and to infer the meaning of identified word and MWE. The CPU 11 then carries out processing for selecting a word and MWE, among the words and MWEs included in a sentence, to be provided with translations that are added into the translation added document image (S144).

The data stored in the dictionary database 22 previously define degrees of difficulty for respective words and MWEs. In addition, the storing unit 14 stores setting information that set degrees of difficulty of words and MWEs whose translations should be added into the translation added document image. A user can handle the inputting unit 15 to previously set the contents of setting information. At the step S144, the CPU 11 selects a word or MWE whose degree of difficulty is higher than the degree of difficulty set by the setting information, and the selected word or MWE is designated to be provided with the translation. The step S144 contributes to select a word and a MWE whose translations should be added. At the step S144, it may be configured to display on the displaying unit 16 about an input screen for inputting the degrees of difficulty set on the words and MWEs whose translations should be added, and to utilize the inputting unit 15 for inputting the degrees of difficulty. Alternatively, it may be configured to select all the words and MWEs whose translations should be added, in response to user's handling on the inputting unit 15.

The CPU 11 then carries out processing for obtaining the translations of selected word and MWE from the dictionary database 22, respectively (S145). In the case that there are plural translations for the selected word or MWE, the CPU 11 obtains a translation corresponding to the meaning inferred by the natural language processing at the step S143. The CPU 11 generates translation data in which the obtained translation is associated with the selected word or MWE, stores the generated translation data in the RAM 12 and returns the procedure to main processing. FIG. 8 is a conceptional view showing example contents of translation data. The MWE "X-ray crystallographic analysis" is selected as a MWE whose translation should be obtained, and the words "confirm", "molecular" and "structure" are selected as words whose translations should be added. This MWE and these words are associated with own translations, respectively.

Figure 9:
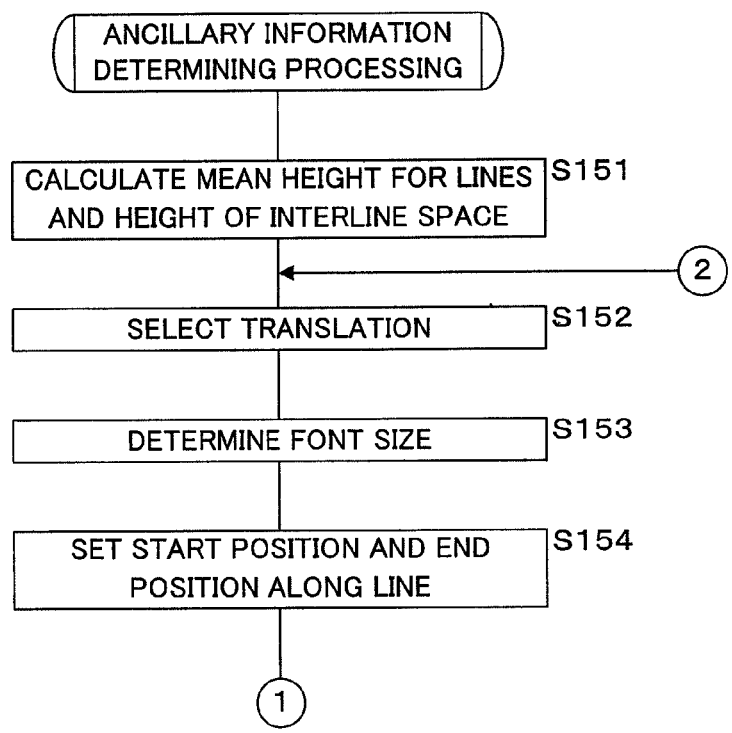
FIG. 9 is a flowchart showing a procedure for ancillary information determining processing of step S15.
Figure 10:
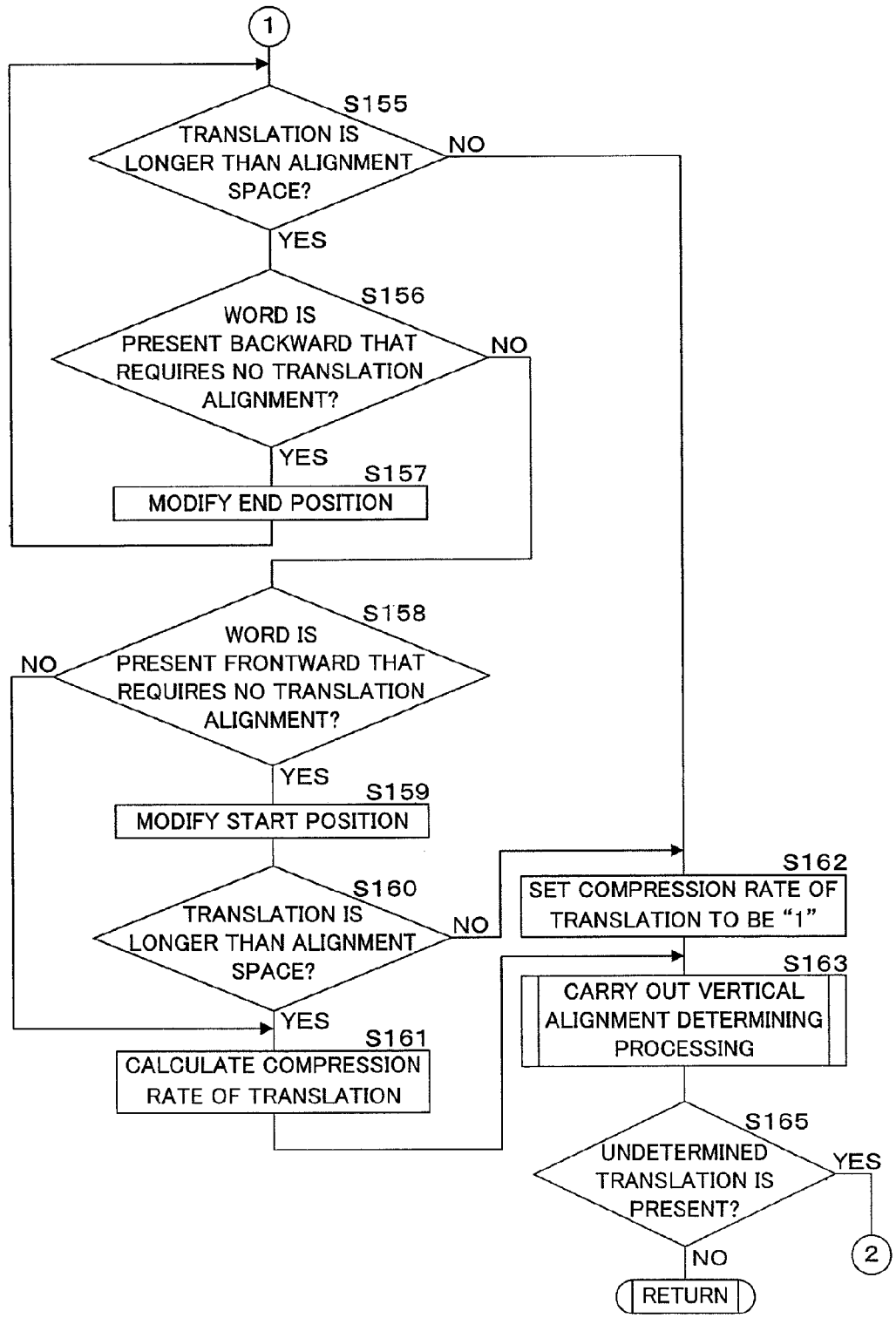
FIG. 10 is a flowchart showing the procedure for ancillary information determining processing of step S15.

The CPU 11 carries out ancillary information determining processing (see FIG. 3) for determining ancillary information that represent alignment conditions of respective obtained translations, such as positions and sizes of translations in the translation added document image (S15). FIG. 9 and FIG. 10 are flowcharts showing a procedure for ancillary information determining processing of step S15. The CPU 11 calculates a mean height for lines included in the original document image and calculates a height (vertical length) of interline space for each line included in the original document image (S151). At the step S151, the CPU 11 obtains Y coordinates for upper ends and bottom ends of characters included in each line, in accordance with the character data, and then utilizes mean Y coordinates for upper ends and bottom ends of characters included in each line for the mean values of each line. Particularly, the CPU 11 utilizes the mean Y coordinate for the upper ends included in one line minus the mean Y coordinate for the lower ends included in said one line, as the mean height of said one line, and utilizes the mean Y coordinate for the lower ends included in said one line minus the mean Y coordinate for the upper ends included in the next line under said one line, as the height of interline space. The CPU 11 stores the calculated mean height and heights of interline space in the RAM 12 in association with corresponding lines, respectively. Then, the CPU 11 selects one translation among the obtained translations (S152).

The CPU 11 then carries out processing for determining a font size of translation (S153). At the step S153, the CPU 11 obtains the height of interline space between one line including the word or MWE whose translation should be added and the next line under said one line, and compares the obtained height of interline space with the font size of word or MWE whose translation should be added. When the height of interline space is less than 40% font size of the word or MWE, the CPU 11 sets the font size of translation to be 40% font size of the word or MWE. When the height of interline space is more than 80% font size of the word or MWE, the CPU 11 sets the font size of translation to be 80% font size of the word or MWE. When the height of interline space is not less than 40% and not more than 80% font size of the word or MWE, the CPU 11 sets the font size of translation to be the height of interline space. Alternatively, it may be configured to utilize the other values than 40% and 80%, as such thresholds.

Since the font size of translation is determined for each word or MWE as shown in the step S153, it is possible to prevent the aligned translation from overlapping the aligned characters for each line, even in the case that the height of interline space is varied in the original document image because lines are distorted during image reading processing. Alternatively, it may be configured in the present invention to determine the font size of translation for each line, instead to determine the font size of translation for each word or MWE. In this alternative case, the font size of translation is not varied within single line. Therefore, it is possible to improve the aesthetic appearance of document provided with the translation in the interline space. Alternatively, it may be configured in the present invention to determine the font size of translation for each character region from which the characters are recognized. In this alternative case, the font size of translation is not varied within single character region, such as a paragraph. Therefore, it is possible to improve the aesthetic appearance of document provided with the translation in the interline space.

The CPU 11 then carries out processing for setting a start position and an end position of translation (S154). The start position and end position are set within an interline space adjacent to the word or MWE whose translation should be added, and the translation is arranged in a space from the start position to the end position. At the step S154, the CPU 11 sets the start position to be the X coordinate for the left end of first character in the word or MWE whose translation should be added, and sets the end position to be the X coordinate for the right end of last character in the word or MWE whose translation should be added. When a line feed is present in the midway of MWE, the CPU 11 sets the end position to be the end of line.

In the present invention, the start position may be shifted by a predetermined length from the left end of first character included in the word or MWE, and the end position may be shifted by a predetermined length from the right end of last character included in the word or MWE.

The CPU 11 then multiplies number of characters included in the translation by the font size of translation in order to calculate the width of translation, subtracts the value of start position from the value of end position in order to calculate the width of space for aligning the translation, and determines whether the calculated width of translation is longer than the calculated width of space or not (S155). When having determined that the calculated width of translation is longer than the calculated width of space (S155: YES), the CPU 11 determines whether or not there is another word, around which another translation should be aligned in the interline space, at an adjacent position in the line backward of the word or MWE whose translation should be added (S156). When having determined that there is such another word around backward of the word or MWE (S156: YES), the CPU 11 selects said another word and sets the end position to be the X coordinate for the right end of last character included in the selected another word, in order to modify the end position (S157). Then, the CPU 11 returns the procedure to the step S155.

When having determined that there is not such another word around backward of the word or MWE (S156: NO), the CPU 11 determines whether or not there is another word, around which another translation should be aligned in the interline space, at an adjacent position in the line forward of the word or MWE whose translation should be added (S158). When having determined that there is such another word forward of the word or MWE (S158: YES), the CPU 11 shifts the start position forward within a range backward of the center of said another word, in order to modify the start position (S159).

At the step S159, for example, the CPU 11 shifts the start position forward by the calculated width of translation minus the calculated width of space, when the calculated width of translation minus the calculated width of space is shorter than the distance between the start position and the center of said another word. For example, when the calculated width of translation minus the calculated width of space is not shorter than the distance between the start position and the center of said another word, the CPU 11 sets the start position to be a position shifted backward by a predetermined length from the center of said another word. When the start position is shifted forward too much, it causes unclearness of relationship between the translation and the word or MWE. Thus, the start position shifted at the step S159 should be a position backward of the center of said another word at the adjacent position in the line forward of the word or MWE whose translation should be added.

The CPU 11 then determines whether or not the calculated width of translation is longer than the width of space calculated with the modified start position (S160). When having determined that the calculated width of translation is longer than the width of space calculated with the modified start position (S160: YES), or when having determined at the step S158 that there is not such another word forward of the word or MWE (S158: NO), the CPU 11 divides the width of space by the width of translation in order to calculate a compression rate of translation width (S161). When having determined at the step S155 that the calculated width of translation is not longer than the calculated width of space (S155: NO), or when having determined at the step S160 that the calculated width of translation is not longer than the width of space calculated with the modified start position (S160: NO), the CPU 11 sets the compression rate of translation width to be "1" (S162).

The translation longer than the word or MWE provided with the translation is compressed for falling into the space where the translation should be aligned, because of the steps from S155 to S162, in the case that there is said such another word forward or backward. Since the translation can be compressed, it is possible to prevent the aligned translation from overlapping another aligned translation. Therefore, it is possible to make the relationship between the translation and the word or MWE become clear. Further, in the case that said such another word is not present forward and backward, the translation can be aligned along the line not only in the interline space adjacent to the word or MWE that should be provided with the translation, but also in the interline space adjacent to word forward or backward of said word or MWE that should be provided with the translation. Thus, the translation can be aligned even to a position adjacent to the word located forward or backward. Therefore, it is possible to prevent the translation from being compressed too much, and to make the aligned translation become a readable size.

After the step S161 or S162, the CPU 11 carries out vertical alignment determining processing for determining the alignment position of translation in the interline space adjacent to the word or MWE and in a direction intersecting the line-writing direction, i.e., in the vertical direction (S163).

Figure 11:
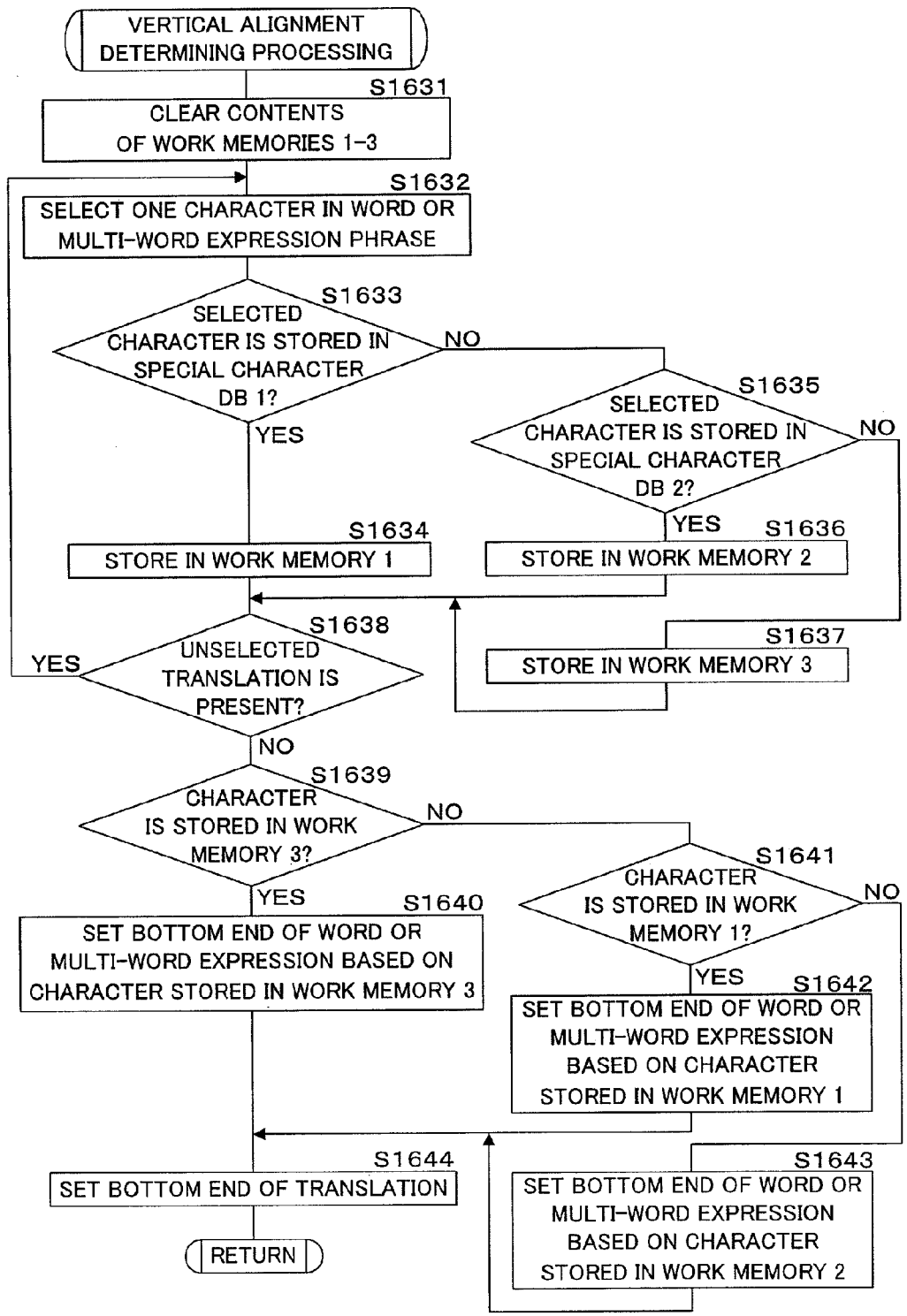
FIG. 11 is a flowchart showing a procedure for vertical alignment determining processing of step S163.

FIG. 11 is a flowchart showing a procedure for the vertical alignment determining processing of step S163. In the procedure of FIG. 11, work memories 1-3 are provided in the RAM 12 for determining. At first of the procedure, the CPU 11 clears storing contents of work memories 1-3 (S1631).

The CPU 11 then sequentially selects one character from the head among characters included in the word or MWE whose translation should be provided (S1632), and determines whether a character code for the selected character is stored in a special character DB 1 (see FIG. 12A) or not (S1633). When having determined that the character code for the selected character is stored in the special character DB 1 (S1633: YES), the CPU 11 stores the character code of selected character in the work memory 1 (S1634).

FIG. 12A and FIG. 12B are explanation views showing characters represented by character codes stored in special character database 23. The special character database 23 is configured with the special character DB 1 illustrated in FIG. 12A and special character DB 2 illustrated in FIG. 12B. The special character DB 1 stores character codes for five characters: "g"; "j"; "p"; "q" and "y" whose shapes have portions to be positioned under the base line of alphabetical font. The special character DB 2 stores character codes for two characters: single-quotation-mark ('); and double-quotation-mark (") that position as the whole away above the base line of alphabetical font.

When a character code stored in the special character DB 1 matches a character code of a character included in the word or MWE whose translation should be provided, the bottom line of word or MWE looks away under the base line. When a character code stored in the special character DB 2 matches a character code of a character included in the word or MWE whose translation should be provided, the bottom line of word or MWE looks away above the base line, on the contrary. When the alignment position of translation for the word or MWE is shifted upward or downward in these cases, vertical adjustment of alignment position can make the translation of word or MWE look aligned within the interline space under the word or MWE.

Figure 13A:
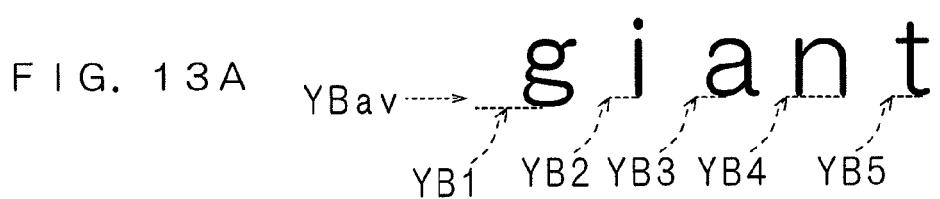
FIG. 13A, FIG. 13B and FIG. 13C are explanation views showing examples of words including characters represented by the character codes stored in the special character database.
Figure 13B:
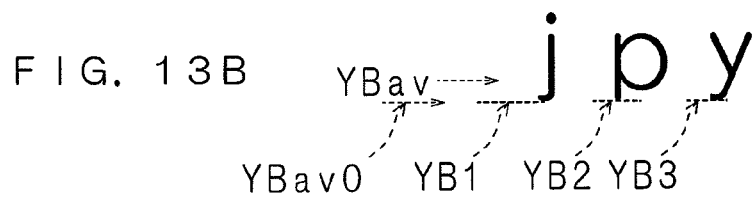
Figure 13C:
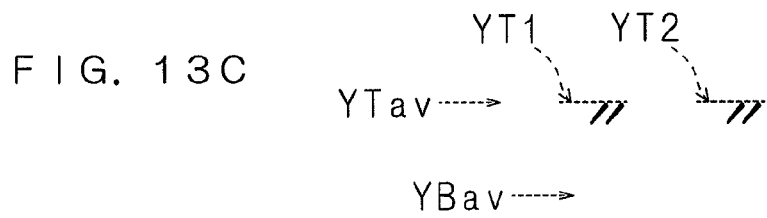

FIG. 13A, FIG. 13B and FIG. 13C are explanation views showing examples of words including characters represented by the character codes stored in the special character database 23. The wording "giant" illustrated in FIG. 13A includes a character "g" whose character code is stored in the special character DB 1. The wording "jpy" illustrated in FIG. 13B is configured with only three characters, and character codes for all of three characters are stored in the special character DB 1. The wording illustrated in FIG. 13C is configured with only two double-quotation-marks (" "), and character codes for all of two character marks are stored in the special character DB 2. The Y coordinates for the bottom ends of characters included in the wording "giant", as well as the wording "jpy", are designated as YBn (n=1, 2, 3, . . . ) sequentially from the head character. The Y coordinates for the top ends of characters included in the wording configured with two double-quotation-marks (" ") are designated as YT1 and YT2 sequentially from the head character.

The following explanation returns to FIG. 11. When having determined that the character code for the selected character is not stored in the special character DB 1 (S1633: NO), the CPU 11 further determines whether the character code for the selected character is stored in the special character DB 2 or not (S1635). When having determined that the character code for the selected character is stored in the special character DB 2 (S1635: YES), the CPU 11 stores the selected character in the work memory 2 (S1634). When having determined that the character code for the selected character is not stored in the special character DB 2 (S1635: NO), the CPU 11 stores the selected character in the work memory 3 (S1637). In short, the work memory 3 stores a character that has been stored neither in the special character DB 1 nor in the special character DB 2.

After the steps S1634, S1636 and S1637, the CPU 11 determines whether or not there is a character that has not been selected yet among the characters included in the word or MWE whose translation should be provided (S1638).

When having determined that there is such the unselected character (S1638: YES), the CPU 11 returns the procedure to the step S1632. When having determined that there is not such the unselected character (S1638: NO), the CPU 11 further determines whether the work memory 3 stores any character or not (S1639).

When having determined that the work memory 3 stores any character (S1639: YES), i.e., when the work memory 3 stores a character that has been stored neither in the special character DB 1 nor in the special character DB 2 as for processing of wording "giant" illustrated in FIG. 13A, the CPU 11 sets the bottom end of alignment position for the word or MWE, based on the character stored in the work memory 3 among the characters included in the word or MWE whose translation should be provided (S1640). In the case of wording "giant", the CPU 11 obtains Y coordinates (YB2, YB3, YB4 and YB5) for the bottom ends of characters "i", "a", "n" and "t", respectively. Then the CPU 11 calculates YBav that is a mean value for the YB2, YB3, YB4 and YB5, and designates the calculated YBav as the Y coordinate for the bottom end of wording "giant".

The present invention is not limited to such YBav that is the calculated mean value. Alternatively, the mathematical median may be utilized instead of the calculated mean value.

When having determined at the step S1639 that the work memory 3 does not store any character (S1639: NO), the CPU 11 determines whether the working memory 1 stores any character or not (S1641). When having determined that the working memory 1 stores any character (S1641: YES), i.e., when the work memory 3 does not store a character that has been stored neither in the special character DB 1 nor in the special character DB 2 but the working memory 1 stores a character that has been stored in the special character DB 1 as for processing of wording "jpy" illustrated in FIG. 13B, the CPU 11 sets the bottom end of alignment position for the word or MWE, based on the character stored in the work memory 1 among the characters included in the word or MWE whose translation should be provided (S1642). In the case of wording "jpy", the CPU 11 obtains Y coordinates (YB1, YB2 and YB3) for the bottom ends of characters "j", "p" and "y", respectively. Then the CPU 11 calculates YBav0 that is a mean value for the YB1, YB2 and YB3, modifies the calculated YBav0 to be shifted upward by a value that the height of interline space for each line calculated at the step S151 is multiplied by a predetermined value (for example, 0.2) in order to calculate YBav, and designates the calculated YBav as the Y coordinates for the bottom end of wording "jpy".

When having determined at the step S1641 that the working memory 1 does not store any character (S1641: NO), i.e., when not only the work memory 1 but also the work memory 3 does not store any character but the working memory 2 stores a character that has been stored in the special character DB 2 as for processing of wording configured with two double-quotation-marks (" ") illustrated in FIG. 13C, in other words, when the working memory 2 stores all characters included in the word or MWE whose translation should be provided, the CPU 11 sets the bottom end of alignment position for the word or MWE, based on the character stored in the work memory 2 (S1643). In the case of wording configured with two double-quotation-marks (" "), the CPU 11 obtains Y coordinates (YT1 and YT2) for the top ends of two character marks (" "), respectively. Then the CPU 11 calculates YTav that is a mean value for the YT1 and YT2, subtracts the average height of line including the two character marks (" ") from the calculated YTav in order to calculate YBav, and designates the calculated YBav as the Y coordinate for the bottom end of wording configured with two double-quotation-marks (" ").

After the step S1640, S1642 or S1643, the CPU 11 determines the alignment position for the bottom end of translation provided to the word or MWE (S1644), and returns the procedure to the ancillary information determining processing. At the step S1644, the CPU 11 determines the alignment position for the bottom end of translation to be a position shifted downward by the font size of translation determined at the step S153 from a position whose Y coordinate is the YBav. In other words, the CPU 11 determines the alignment position of translation in vertical direction, at the step S1644. Because of the vertical alignment determining processing at the step S163, the alignment position of translation in the translation added document is determined to be within the interline space adjacent to the word or MWE in the document. In addition, the processing at the steps S153-156 contribute to determine the ancillary information that represent the font size, alignment position and compression rate of the translation selected at the step S152.

Alternatively, the present invention may be configured to determine the alignment position to be further shifted downward from the calculated alignment position for the bottom end of translation at the step S1644. In this alternative case, the present invention contributes to improve readability because a further space can be provided between the translation and the word or MWE. In addition, the present invention may be configured to detect both the position and gradient of line and to determine the alignment position of translation along the detected gradient of line. In this additional case, it is possible to align the translation properly even when lines of original document image are tilted because lines are distorted during image reading processing.

After the processing at the step S163, the CPU 11 determines whether or not there is a translation whose ancillary information has not been determined among the obtained translations (S165). When having determined that there is a translation whose ancillary information has not been determined yet (S165: YES), the CPU 11 returns the procedure to the step S152 and selects the translation whose ancillary information has not been determined yet. When having determined that there is not such the translation whose ancillary information has not been determined yet (S165: NO), the CPU 11 associates the determined ancillary information with the translation included in the translation data, stores the associated translation data in the RAM 12 and returns the procedure to main processing. The processing at the steps S13-S15 are carried out on each of the character regions extracted at the step S12.

The CPU 11 then aligns each translation in the alignment condition defined by the ancillary information into an image having similar size as the original document image, and thus carries out the processing for generating the translation image (S17). At the step S17, the CPU 11 expresses each translation included in the translation data with the size represented by the ancillary information, aligns the expressed translation at the position represented by the ancillary information in the image having the same size as the original document image, and thus generates the translation image. For example, the expressed translation with the font size represented by the ancillary information is compressed by the proper compression rate, the left end of head character included in the compressed translation is located at the start position, and the bottom end of translation is fitted into the vertical alignment position, for generating the translation added image. At the step S17, the CPU 11 further underlines the MWE in the translation image whose translation has been obtained. At the step S17, the CPU 11 furthermore associates each character aligned in the translation image with the text data representing each character. At the step S17, the CPU 11 moreover makes the generated translation image be transparent except for the translations and the underlines.

FIG. 14 is a schematic view showing an example of translation image. The example illustrated in FIG. 14 is a translation image generated from the original document image illustrated in FIG. 2A. The translations for the word and MWE in the original document image are aligned in the translation image of FIG. 14. Furthermore, lines are aligned in the translation image of FIG. 14 for the underlines to be added to the MWE "X-ray crystallographic analysis" in the original document image.

The CPU 11 then generates a transparent text image in which text data representing each character is associated with the alignment position of each character in the transparent image having the same size as the original document image and the alignment position in the transparent image corresponds to the alignment position in the original document image. The CPU 11 superimposes both the generated transparent text image and the generated translation image onto the original document image, in order to generate a translation added document image (S18). For example, the translation added document image is generated in the portable document format (PDF) at the step S18. The CPU 11 designates the original document image as a first image layer, the transparent text image as a second image layer and the translation image as a third image layer, and superimposes these three image layers for generating the translation added document in the PDF. The translation added document image illustrated in FIG. 2B is generated from the original document image illustrated in FIG. 2A on which the translation image illustrated in FIG. 14 is superimposed. Since the transparent text image and the translation image are superimposed on the original document image for generating the translation added document image, it is possible to utilize the translation added document image for searching test contents and translation contents, and further to facilitate copying the text contents and translation contents.

The CPU 11 then sends image data representing the translation added document image from the interfacing unit 17 to the image forming apparatus 32, carries out processing for making the image forming apparatus 32 form the translation added document image based on the image data (S19), and completes the document image generating processing according to the present invention. Alternatively, the present invention may be configured to display the translation added document image on the displaying unit 16 or to store image data representing the translation added document image in the storing unit 14 at the step S19, instead of the processing for forming the translation added document image.

These processing described above contribute to generate the translation added document image illustrated in FIG. 2B. Thus, a translation is generated for a wording consisting of a word or MWE included in an original document image, and the generated translation is aligned in an interline space adjacent to the consist word or MWE. Therefore, a user can utilize the translation of translation added document to facilitate understanding the contents of original document.

The alignment position of supplemental annotation can be changed upward or downward, in accordance with the determination whether a character included in the wording is identical to the special shape character stored in the special character database or not. Thus, the alignment position of supplemental annotation to be added to the wording can be set basically in accordance with the wording position that is based on the vertical position of each character included in the wording, but can be set in accordance with the different position from the wording position when the wording includes at least one character having the special shape.

Although the wording position is changed in accordance with the fact whether the wording includes a character having special shape or not, adjustment of such the wording position can contribute to determine the alignment position in which the supplemental annotation should be aligned, and the aligned supplemental annotation looks aligned within the interline space under the wording.

The special character database stores characters "g", "j", "p", "q" and "y" whose shapes have portions to be positioned under the base line of alphabetical font and/or character marks including single-quotation-mark (') and double-quotation-mark (") that position as the whole away above the base line of alphabetical font. Thus, it is possible to properly adjust the wording position with maximally taking into consideration about variety of vertical character positions based on the shapes of characters included in the wording. Therefore, when the wording consists of only characters stored in the special character database, the alignment position of supplemental annotation is determined to be shifted upward (or downward) from the mean vertical position of character, because the wording position is determined to look urged downward (or upward) from the mean vertical position of character. When the wording includes at least one character that is not stored in the special character database, the alignment position of supplemental annotation is determined to be the mean vertical position of character that is calculated with all characters which are included in the wording but not stored in the character database.

In other words, when the wording consists of only characters that are not stored in the special character database, the alignment position of supplemental annotation is determined in accordance with the mean vertical position of character that is calculated with characters included in the wording. On the contrary, when the wording includes at least one character that is stored in the special character database, the alignment position of supplemental annotation is determined to be shifted upward (or downward) against the mean vertical position of character that is calculated with characters included in the wording.

Therefore, it is possible to adjust the alignment position of supplemental annotation and to prevent the adjusted alignment position from being separated unnaturally from the bottom end of wording consisting of a word or MWE.

Since the translation added document image is generated from the original document image on which the translation image is superimposed, the size and position of character in the original document image is not changed even in the translation added document image. Thus, the text layout is kept constant between in the original document image and in the translation added document image. Therefore, it is easy to compare the text contents in original document image and the text contents in the translation added document image, and to facilitate understanding the text contents in original document image. In addition, the translation added document image is configured to be provided with a translation for a word or MWE, but not a translation for just a whole sentence, a user can easily recognize the relationship between the translation and the word or MWE become clear in the translation added document image and can easily understand the text contents in original document image. Even in the case that original document includes a misspelling word, misrecognition occurs in the character recognition processing, a mistranslation occurs due to inadequacy of natural language processing and the like, it is easy to assume in reference with preceding and following context that there is a wrong translation although such a wrong translation is added into the translation added document image. Therefore, even such the cases do not majorly interrupt user's understanding of the text contents in original document image. In addition, since the present invention does not carry out processing for fundamentally changing the original document image, character recognition processing does not cause generating the original text having wrong contents due to misrecognition and the like. Therefore, a user can correctly understand the text contents of original document.

In this embodiment, the document image generating apparatus 1 is explained as a general purpose computer connected to the image reading apparatus 31 and the image forming apparatus 32. However, the present invention is not limited to such the general purpose computer. Alternatively, the document image generating apparatus 1 may be an image processing apparatus, such as a scanner having image reading function and a multi-function printer. In this embodiment, the document image generating apparatus 1 is explained to perform the document image generating method according to the present invention based on the computer program 21. However, the present invention is not limited to such explanation. Alternatively, the document image generating apparatus 1 may be provided with an information processing circuit dedicated to performing a part or whole of document image generating method according to the present invention, for implementing processing according to the present invention.

Although this embodiment is explained to perform the processing according to the present invention on the original document image generated by the image reading apparatus 31, the document image generating apparatus 1 may be configured alternatively to perform the processing according to the present invention on the original document image obtained by another method. For example, the document image generating apparatus 1 may be configured to receive image data sent from an external device by facsimile communication method or e-mail method, and to perform the processing regarding the document image generating method on the received image data. For example, the document image generating apparatus 1 may be configured to include an image capturing device connected to the interfacing unit 17, to utilize the image capturing device for capturing an image of original document and to perform the processing regarding the document image generating method on the captured image of original document.

For example, the document image generating apparatus 1 may be configured to include a communicating unit instead of the interfacing unit 17, which is connected to a communication network connected with an external Web server apparatus. Then, the document image generating apparatus 1 may be configured to utilize the communicating unit for receiving Web page data sent from the Web page server apparatus and to perform the processing regarding the document image generating method on image data based on the received Web page data. Particularly speaking, the document image generating apparatus 1 may be configured to generate image data representing the original document image, i.e., the Web page based on the received Web page data, and to store the generated image data and the received Web page data in the RAM 12. In the case that the Web page data is like image data and text data can be extracted from the Web page data, characters recognized from the original document image based on image data stored in RAM 12 may be configured to fit the text data extracted from the Web page data stored in the RAM 12. The translation added document image generated by the processing according to the present invention may be displayed on the displaying unit 16 or may be set from the interfacing unit 17 to the image forming apparatus 32.

In addition, this embodiment is explained to obtain the translation for the word or MWE, as the ruby (supplemental annotation), and to generate the translation added document image where the obtained translation is aligned in the interline space. However, the ruby according to the present invention is not limited to such the translation. For example, the present invention may be configured to align reading information, such as a kana-reading, phonetic alphabet, Pinyin or the like for the word or MWE, as the ruby, in the interline space adjacent to the word or MWE. In this example case, a user can know the reading of word or MWE included in the original document, because of the aligned reading information. For example, the present invention may be configured to align supplemental annotations indicating the meaning, synonym, etymology for the word or MWE, as the ruby, in the interline space adjacent to the word or MWE. In this example case, a user can easily understand a highly esoteric wording, highly technical term and the like even which are written in user's mother language. In these example cases, the document image generating apparatus 1 may be configured to store the reading information or the supplemental annotation associated with the word or MWE previously in the dictionary database 22, and to obtain needed reading information and needed supplemental annotation from the dictionary database 22.

In addition, this embodiment is explained to align the supplemental annotation in the interline space under the wording written horizontally. However, the supplemental annotation may be aligned in the interline space above the wording written horizontally. Furthermore, the present invention may be applied to a text written vertically. For example, when the present invention is applied to a Japanese text written vertically, the translation may be aligned in the interline space rightward and adjacent to the word or MWE.

In this embodiment, the document image generating apparatus 1 is explained to arrange the dictionary database 22 in the storing unit 14. However, the present invention is not limited to this explanation. The document image generating apparatus according to the present invention may be configured to utilize an external dictionary database for carrying out processing according to the present invention. For example, such the dictionary database may be stored in a server apparatus located outside the document image generating apparatus, and the document image generating apparatus read out needed data from the external dictionary database for carrying out the processing according to the present invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A document image generating apparatus, comprising:
    an accepting unit that accepts an image data representing a document image;
    a word extracting unit that extracts a word included in the document image represented by the image data accepted by the accepting unit;
    a character extracting unit that extracts characters included in the word extracted by the word extracting unit;

a special character storing unit that stores a special character among characters to be extracted by the character extracting unit;
a determining unit that determines whether the special character stored in the special character storing unit is included in characters extracted by the character extracting unit or not;
a preparing unit that prepares a ruby for the word extracted by the word extracting unit;
a generating unit that generates a ruby-added image data representing a ruby-added image in which the ruby prepared by the preparing unit is added to the document image represented by the image data accepted by the accepting unit; and
an adjusting unit that adjusts a position of the ruby prepared by the preparing unit in the ruby-added image represented by the ruby-added image data generated by the generating unit, wherein
the adjustment amount of ruby adjusted by the adjusting unit when the determining unit determines that the special character stored in the special character storing unit is included in characters extracted by the character extracting unit (case A) is different from the adjustment amount of ruby adjusted by the adjusting unit when the determining unit determines that the special character stored in the special character storing unit is not included in characters extracted by the character extracting unit (case B), such that the position of ruby would be the same in case A as in case B,
wherein
a position of the ruby in the ruby-added image data generated by the generating unit is determined in accordance with an average height value of characters extracted by the character extracting unit except for the special character.

2. A document image generating apparatus according to claim 1, further comprising:
a multi-word expression extracting unit that extracts a multi-word expression included in the document image represented by the image data accepted by the accepting unit;
the character extracting unit extracts characters included in the multi-word expression extracted by the multi-word expression extracting unit;
the preparing unit prepares a second ruby for the multi-word expression extracted by the multi-word expression extracting unit;
the generating unit generates a second ruby-added image data representing a second ruby-added image in which the second ruby prepared by the preparing unit is added to the document image represented by the image data accepted by the accepting unit; and
the adjusting unit adjusts a position of the second ruby prepared by the preparing unit in the second ruby-added image represented by the second ruby-added image data generated by the generating unit, wherein
the determining unit further determines whether the special character stored in the special character storing unit is included in characters extracted by the character extracting unit or not, and
the adjustment amount of second ruby adjusted by the adjusting unit when the determining unit determines that the special character stored in the special character storing unit is included in characters extracted by the character extracting unit is different from the adjustment amount of second ruby adjusted by the adjusting unit when the determining unit determines that the special character stored in the special character storing unit is not included in characters extracted by the character extracting unit.

3. A document image generating apparatus according to claim 2, further comprising:
a sentence extracting unit that extracts a sentence included in the document image represented by the image data accepted by the accepting unit;
the character extracting unit extracts characters included in the sentence extracted by the sentence extracting unit;
the preparing unit prepares a third ruby for the sentence extracted by the sentence extracting unit;
the generating unit generates a third ruby-added image data representing a third ruby-added image in which the third ruby prepared by the preparing unit is added to the document image represented by the image data accepted by the accepting unit; and
the adjusting unit adjusts a position of the third ruby prepared by the preparing unit in the third ruby-added image represented by the third ruby-added image data generated by the generating unit, wherein
the determining unit further determines whether the special character stored in the special character storing unit is included in characters extracted by the character extracting unit or not, and
the adjustment amount of third ruby adjusted by the adjusting unit when the determining unit determines that the special character stored in the special character storing unit is included in characters extracted by the character extracting unit is different from the adjustment amount of third ruby adjusted by the adjusting unit when the determining unit determines that the special character stored in the special character storing unit is not included in characters extracted by the character extracting unit.

4. A document image generating apparatus according to claim 1, wherein
the ruby is a translation or a pronunciation for the word extracted by the word extracting unit.

5. A document image generating apparatus according to claim 2, wherein
the second ruby is a translation or a pronunciation for the multi-word expression extracted by the multi-word expression extracting unit.

6. A document image generating apparatus according to claim 3, wherein
the third ruby is a translation or a pronunciation for the sentence extracted by the sentence extracting unit.

7. A document image generating apparatus according to claim 1, wherein
the word extracted by the word extracting unit is written horizontally and configured with plural characters.

8. A document image generating apparatus according to claim 7, wherein
the special character storing unit stores "g", "j", "p", "q" and "y" as the special character.

9. A document image generating apparatus according to claim 7, wherein
the special character storing unit stores a single quotation mark and a double quotation mark, as the special character.

10. A document image generating apparatus according to claim 8, wherein
the adjusting unit adjusts the position of ruby when the determining unit determines that any of "g", "j", "p", "q" and "y" is included in the characters extracted by the character extracting unit to be downward from the position of ruby when the determining unit determines that none of "g", "j", "p", "q" and "y" is included in the characters extracted by the character extracting unit.

11. A document image generating apparatus according to claim 9, wherein
the adjusting unit adjusts the position of ruby when the determining unit determines that any of single quotation mark and double quotation mark is included in the characters extracted by the character extracting unit to be upward from the position of ruby when the determining unit determines that none of single quotation mark and double quotation mark is included in the characters extracted by the character extracting unit.

12. A document image generating apparatus according to claim 1, wherein the ruby prepared by the preparing unit is based on a ruby data representing the ruby, and the ruby data is kept independently from the image data accepted by the accepting unit.

13. A document image generating apparatus according to claim 1, further comprising:
a reading unit that reads an original document, wherein
the image data accepted by the accepting unit represents the original document read by the reading unit.

14. A document image generating apparatus according to claim 1, further comprising:
an image forming unit that forms an image on a paper in accordance with the ruby-added image data generated by the generating unit, wherein
the image formed by the image forming unit is the ruby-added image.

15. An image generating method for generating an image with utilizing an image generating apparatus, comprising steps of:
inputting an image data representing a document image into the image generating apparatus;
extracting a word included in the document image represented by the input image data;
extracting characters included in the extracted word;
storing a special character, among characters to be extracted, in the image generating apparatus;
determining whether the special character stored in the image generating apparatus is included in the extracted character or not;
preparing a ruby for the extracted word;
generating a ruby-added image data representing a ruby-added image in which the prepared ruby is added to the document image represented by the input image data; and
adjusting a position of the prepared ruby in the ruby-added image represented by the generated ruby-added image data, wherein
the adjustment amount of the prepared ruby when it is determined that the special character is included in the extracted characters (case A) is different from the adjustment amount of the prepared ruby when it is determined that the special character is not included in the extracted characters (case B), such that the position of ruby would be the same in case A as in case B,
wherein
a position of the ruby in the ruby-added image data generated by the generative step is determined in accordance with an average height value of characters extracted by the character extracting step except for the special character.

16. An image generating method according to claim 15, further comprising steps of:
extracting a phrase included in the document image represented by the input image data;
extracting characters included in the extracted phrase;
determining whether the special character stored in the image generating apparatus is included in the characters extracted from the extracted phrase or not;
preparing a second ruby for the extracted phrase;
generating a second ruby-added image data representing a second ruby-added image in which the prepared second ruby is added to the document image represented by the input image data; and
adjusting a position of the prepared second ruby in the second ruby-added image represented by the generated second ruby-added image data, wherein
the adjustment amount of the prepared second ruby when it is determined that the special character is included in the characters extracted from the extracted phrase is different from the adjustment amount of the prepared second ruby when it is determined that the special character is not included in the characters extracted from the extracted phrase.

17. An image generating method according to claim 16, further comprising steps of:
extracting a sentence included in the document image represented by the input image data;
extracting characters included in the extracted sentence;
determining whether the special character stored in the image generating apparatus is included in the characters extracted from the extracted sentence or not;
preparing a third ruby for the extracted sentence;
generating a third ruby-added image data representing a third ruby-added image in which the prepared third ruby is added to the document image represented by the input image data; and
adjusting a position of the prepared third ruby in the third ruby-added image represented by the generated third ruby-added image data, wherein
the adjustment amount of the prepared third ruby when it is determined that the special character is included in the characters extracted from the extracted sentence is different from the adjustment amount of the prepared third ruby when it is determined that the special character is not included in the characters extracted from the extracted sentence.

18. A non-transitory recording medium that records a computer program for generating an image with utilizing an image generating apparatus, wherein the computer program when executed causes a computer system to execute steps of:
inputting an image data representing a document image into the image generating apparatus;
extracting a word included in the document image represented by the input image data;
extracting characters included in the extracted word;
storing a special character, among characters to be extracted, in the image generating apparatus;
determining whether the special character stored in the image generating apparatus is included in the extracted characters or not;
preparing a ruby for the extracted word;
generating a ruby-added image data representing a ruby-added image in which the prepared ruby is added to the document image represented by the input image data; and
adjusting a position of the prepared ruby in the ruby-added image represented by the generated ruby-added image data, wherein
the adjustment amount of the prepared ruby when it is determined that the special character is included in the extracted characters (case A) is different from the adjustment amount of the prepared ruby when it is determined that the special character is not included in the extracted characters (case B), such that the position of ruby would be the same in case A as in case B,
wherein
a position of the ruby in the ruby-added image data generated by the generating step is determined in accordance with an average height value of characters extracted by the character extracting step except for the special character.

19. A non-transitory recording medium according to claim 18, wherein the computer program when executed causes the computer system to execute further steps of:
- extracting a phrase included in the document image represented by the input image data;
- extracting characters included in the extracted phrase;
- determining whether the special character stored in the image generating apparatus is included in the characters extracted from the extracted phrase or not;
- preparing a second ruby for the extracted phrase;
- generating a second ruby-added image data representing a second ruby-added image in which the prepared second ruby is added to the document image represented by the input image data; and
- adjusting a position of the prepared second ruby in the second ruby-added image represented by the generated second ruby-added image data, wherein
- the adjustment amount of the prepared second ruby when it is determined that the special character is included in the characters extracted from the extracted phrase is different from the adjustment amount of the prepared second ruby when it is determined that the special character is not included in the characters extracted from the extracted phrase.

20. A non-transitory recording medium according to claim 19, wherein the computer program when executed causes the computer system to execute further steps of:
- extracting a sentence included in the document image represented by the input image data;
- extracting characters included in the extracted sentence;
- determining whether the special character stored in the image generating apparatus is included in the characters extracted from the extracted sentence or not;
- preparing a third ruby for the extracted sentence;
- generating a third ruby-added image data representing a third ruby-added image in which the prepared third ruby is added to the document image represented by the input image data; and
- adjusting a position of the prepared third ruby in the third ruby-added image represented by the generated third ruby-added image data, wherein
- the adjustment amount of the prepared third ruby when it is determined that the special character is included in the characters extracted from the extracted sentence is different from the adjustment amount of the prepared third ruby when it is determined that the special character is not included in the characters extracted from the extracted sentence.

\* \* \* \* \*